United States Patent
Wingfield et al.

(10) Patent No.: US 11,847,914 B2
(45) Date of Patent: Dec. 19, 2023

(54) AIR POLLUTION DETECTION AND REMEDIATION SYSTEMS AND METHODS

(71) Applicant: Ford Global Technologies, LLC, Dearborn, MI (US)

(72) Inventors: Eric Wingfield, Ann Arbor, MI (US); Doug Moore, Southfield, MI (US); Gwen Hickey, Dearborn, MI (US); Ananda Palanisamy, Dearborn, MI (US); Robert De Kleine, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 17/155,576

(22) Filed: Jan. 22, 2021

(65) Prior Publication Data

US 2022/0234414 A1    Jul. 28, 2022

(51) Int. Cl.
*G08G 1/0968* (2006.01)
*G08G 1/048* (2006.01)
*G08G 1/01* (2006.01)

(52) U.S. Cl.
CPC ..... *G08G 1/096833* (2013.01); *G08G 1/0112* (2013.01); *G08G 1/048* (2013.01); *G08G 1/096822* (2013.01)

(58) Field of Classification Search
CPC ........... G08G 1/096833; G08G 1/0112; G08G 1/048; G08G 1/096822; B60H 1/00657; B60H 1/00771; B60H 1/008; Y02A 50/20
See application file for complete search history.

(56) References Cited

U.S. PATENT DOCUMENTS 10,440,452 B2    10/2019 Mach et al.
2017/0076509 A1*  3/2017 Scofield ................. G06Q 40/08
(Continued)

OTHER PUBLICATIONS

Devarakonda, S., Sevusu, P., Liu, H., Liu, R., Iftode, L., & Nath, B. (Aug. 2013). Real-time air quality monitoring through mobile sensing in metropolitan areas. In Proceedings of the 2nd ACM SIGKDD international workshop on urban computing (pp. 1-8). (Year: 2013).*

(Continued)

*Primary Examiner* — Ig T An
*Assistant Examiner* — Stephanie T Su
(74) *Attorney, Agent, or Firm* — Brandon Hicks; Eversheds Sutherland (US) LLP

(57) ABSTRACT

The disclosure generally pertains to systems and methods for using vehicles to detect and remediate air pollution. In an example implementation, a server computer transmits a directive to a vehicle controller of a vehicle, to measure an air pollution level around the vehicle at a first location. The vehicle controller executes an air pollution measurement and transmits measurement data to the server computer. The server computer evaluates the measurement data and directs the vehicle controller to perform a remedial action for reducing the air pollution level at the first location. The remedial action can involve, for example, the vehicle controller moving the vehicle from the first location to a second location. The server computer may also determine whether the first location is a transient pollution location or a persistent pollution by directing the vehicle controller to carry out measurements at two different times and/or by employing two different sampling rates.

16 Claims, 4 Drawing Sheets

(56) References Cited

U.S. PATENT DOCUMENTS

| | | | |
|---|---|---|---|
| 2017/0272338 A1* | 9/2017 | Borrel | H04W 4/023 |
| 2018/0376306 A1 | 12/2018 | Ramalho De Oliveira | |
| 2019/0084369 A1 | 3/2019 | Duan et al. | |
| 2019/0353502 A1* | 11/2019 | Doshi | G01D 21/00 |
| 2020/0234584 A1* | 7/2020 | Youm | G08G 1/143 |
| 2023/0243678 A1* | 8/2023 | Shire | G01D 21/00 |
| | | | 702/188 |

OTHER PUBLICATIONS

Vijay Sivaraman et al., "Hazewatch: A Participatory Sensor System For Monitoring Air Pollution in Sydney", ResearchGate.net Conference Paper, Publication No. 258113614, Eight IEEE Workshop on Practical Issues in Building Sensor Network Applications, Oct. 2013, 10 pages.

Bosch Mobility Solutions, "V2X connectivity control unit", Robert Bosch GmbH, 2020, 12 pages.

* cited by examiner

AIR POLLUTION DETECTION AND REMEDIATION SYSTEMS AND METHODS

BACKGROUND

Air pollution can vary from place to place due to various reasons. For example, a level of air pollution in a town may be lower than that in a city because of reasons such as population density and traffic density. Furthermore, while it may be relatively easy to measure air pollution in a town such as, for example, along a main street of the town, it is harder to measure air pollution in a city where there may be many roads with various levels of traffic at various times. It is therefore desirable to provide solutions that identify various issues related to air pollution at various locations and solutions that may address these issues.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
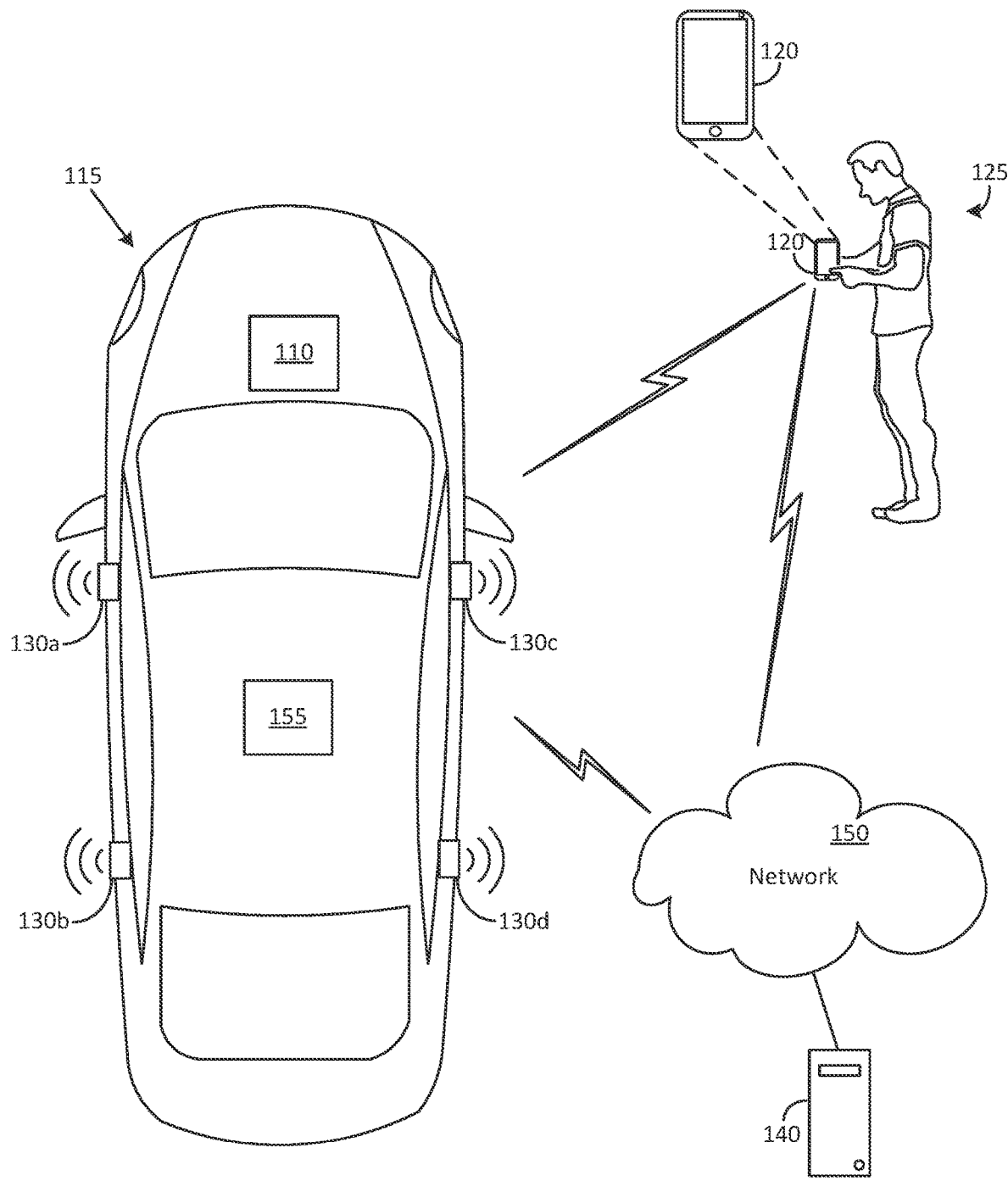
FIG. 1 illustrates an example vehicle that is configured to generate air pollution data in accordance with an embodiment of the disclosure.

In terms of a general overview, this disclosure is directed to systems and methods to use vehicles to detect and remediate air pollution. In an example implementation, a server computer transmits a directive to a vehicle controller of a vehicle. The directive directs the vehicle controller to measure an air pollution level around the vehicle at a first location. The vehicle controller executes an air pollution measurement and transmits measurement data to the server computer. The server computer evaluates the measurement data and directs the vehicle controller to perform a remedial action to reduce the air pollution level at the first location. An example remedial action can involve, for example, moving the vehicle from the first location to a second location. Another example remedial action that may be performed by the server computer is sending a directive to another vehicle to avoid traveling to the first location. The server computer may also determine whether the first location is a transient pollution location or a persistent pollution by directing the vehicle controller to carry out measurements at two different times and/or by employing two different sampling rates. Measurements may also be carried out by multiple vehicles at the first location in order to identify other parameters such as, for example, a rate of change in air pollution at the first location, a spreading characteristic of pollutants causing the air pollution at the first location, and various factors that contribute to the change in air pollution at the first location.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases that are used herein should be interpreted as referring to various objects and actions that are generally understood in various forms and equivalencies by persons of ordinary skill in the art. For example, the phrase "user device" as used herein is applicable to any device that a person may use to run software that performs various operations in accordance with the disclosure. The word "vehicle" as used in this disclosure can pertain to any of various types of vehicles such as cars, vans, sports utility vehicles, trucks, electric vehicles, gasoline vehicles, and hybrid vehicles. The word "vehicle" as used herein can also encompass various types of airborne vehicles such as, for example, unmanned aerial vehicles, commuter aircraft, and personal aircraft (single person aircraft) that may proliferate in certain areas and contribute to air traffic congestion and air pollution in these areas. The phrase "autonomous vehicle" as used in this disclosure generally refers to a vehicle that can perform at least a few operations without human intervention. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer/controller. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation. The phrase "software application" as used herein refers to code (firmware, software, machine code etc.) that can be installed or downloaded into various devices such as, for example, a vehicle controller of a vehicle or a user device of an individual (a smartphone, for example). The code may be executed by a processor to implement various actions in accordance with the disclosure. The term "server computer" as used herein may refer to any cloud-based computing device or to any computing device that is communicatively coupled to other devices via a network (such as the Internet, for example). It should be understood that the word "example" as used herein is intended to be non-exclusionary and non-limiting in nature.

FIG. 1 illustrates an example vehicle 115 that is configured to generate air pollution data in accordance with an embodiment of the disclosure. The vehicle 115 can be any of various types of vehicles that are either driver-operated, partially autonomous, or fully autonomous. In one example embodiment, the vehicle 115 is a non-autonomous vehicle that is operated by a driver. In another example embodiment, which is illustrated in FIG. 1, the vehicle 115 can be any of a Level 1 through Level 5 autonomous vehicle.

Various operations of the vehicle 115 can be controlled via directives received by a vehicle controller 110 of the vehicle 115 from a remote device (such as a server computer 140) and/or from a user device 120 operated by an individual 125. In some scenarios, the individual 125 can be a driver who is seated inside the vehicle 115. In some other scenarios, the individual 125 may be located outside the vehicle 115 (as illustrated in FIG. 1).

The user device 120 of the individual 125 may be any of various devices such as, for example, a smartphone, a smart wearable, a tablet computer, a laptop computer, and a desktop computer. In the illustrated example scenario, the user device 120 is a smartphone held by the individual 125 while standing outside the vehicle 115. In another example scenario, the user device 120 can be a laptop computer or a desktop computer that is operated by the individual 125 when the individual 125 is located inside a building, such as, for example, when seated in the lobby of a hotel, a room in a house, or in an airport terminal.

In general, the user device 120 can include a processor, a memory, and communication hardware. The memory, which is one example of a non-transitory computer-readable medium, may be used to store an operating system (OS) and various code modules such as, for example, a control application for controlling the vehicle 115. The code modules are provided in the form of computer-executable instructions that can be executed by the processor for performing various operations in accordance with the disclosure. The communication hardware can include one or more wireless transceivers, such as, for example, a cellular transceiver (when the user device 120 is a cellular phone) or a WiFi transceiver (when the user device 120 is a laptop computer, for example) that allows the user device 120 to transmit and/or receive various types of wireless signals to/from the vehicle controller 110. The communication hardware can also include hardware for communicatively coupling the user device 120 to a communications network 150 for carrying out communications and data transfers with various devices and systems such as, for example, the server computer 140.

The vehicle 115 may include various components such as, for example, the vehicle controller 110, a sensor system 155, and a wireless communication system that may include a set of wireless communication nodes 130a, 130b, 130c, and 130d. The vehicle controller 110 can include a processor, a memory, and communication hardware. The memory, which is another example of a non-transitory computer-readable medium, may be used to store an OS and various code modules. The code modules are provided in the form of computer-executable instructions that can be executed by the processor for performing various operations in accordance with the disclosure. The memory can also contain a database for storing information such as, for example, various maps, air pollution data, travel routes, times to travel, and travel destinations.

The vehicle controller 110 may perform various functions such as, for example, controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The vehicle controller 110 may also control various actions performed by the vehicle 115 such as, for example, traveling on a travel route towards a designated destination without human intervention, avoiding accidents, avoiding collisions, and responding to directives received from the user device 120 and/or the server computer 140 for measuring air pollution levels in accordance with the disclosure.

The wireless communication nodes 130a, 130b, 130c, and 130d may be mounted upon the vehicle 115 in a manner that allows the vehicle controller 110 to communicate with devices such as the user device 120 carried by the individual 125. In an alternative implementation, a single wireless communication node may be mounted upon the roof of the vehicle 115. The wireless communication system may be used by the vehicle controller 110 to communicate with various devices, various objects, and various other vehicles, when executing actions in accordance with the disclosure. The communications may be carried out using technologies such as, for example, vehicle-to-vehicle (V2V) technology, vehicle-to-infrastructure (V2I) technology, vehicle-to-everything (V2X) technology, and vehicle-to-pedestrian (V2P) technology. The communications may be also carried out by using wireless technologies such as, for example, cellular (5G, for example), Wi-Fi, Bluetooth®, Ultra-Wideband (UWB), Zigbee®, Li-Fi (light-based communication), dedicated short range communications (DSRC), audible communication, ultrasonic communication, or near-field-communications (NFC).

The vehicle controller 110 can communicate with the server computer 140 via the communications network 150, which may include any one network, or a combination of networks, such as, for example, a local area network (LAN), a wide area network (WAN), a telephone network, a cellular network, a wireless network, and/or private/public networks such as the Internet. The communications network 150 may support communication technologies such as cellular, Wi-Fi, Wi-Fi direct, Bluetooth®, Ultra-Wideband, near-field communication (NFC), Li-Fi, V2V, V2I, V2X, V2P, machine-to-machine communication, and/or man-to-machine communication. At least one portion of the communications network 150 includes a wireless communication link that allows the server computer 140 to communicate with one or more of the wireless communication nodes 130a, 130b, 130c, and 130d on the vehicle 115. The server computer 140 may communicate with the vehicle controller 110 for various purposes such as, for example, to convey a directive to perform an air quality measurement in accordance with the disclosure.

The user device 120 may communicate with the vehicle controller 110 via one or more of the first set of wireless communication nodes 130a, 130b, 130c, and 130d so as to allow the individual 125 (for example a driver who is outside the vehicle 115) to direct the vehicle 115 to perform an air quality measurement in accordance with an embodiment of the disclosure.

The sensor system 155 can include one or more sensors that perform various types of air quality measurements. More particularly, the sensor system 155 can include sensors that measure local air pollutants that may be present in the air surrounding the vehicle 115. Some examples of local air pollutants can include particulate matter, black carbon, nitrogen oxides, and volatile organic compounds Pollution data is conveyed from the sensor system 155 to the vehicle controller 110 for executing various operations in accordance with the disclosure. In an example implementation, the pollution data may be evaluated by the vehicle controller 110 and transmitted to the server computer 140 in the form of an air quality index (AQI). In another example implementation, the vehicle controller 110 may convey raw sensor data to the server computer 140 and the server computer 140 may evaluate the raw sensor data to determine the AQI. The AQI may be calculated by evaluating the raw sensor data over a period of time and/or by applying mathematical/statistical procedures such as, for example, averaging, mean value, and distribution.

Figure 2:
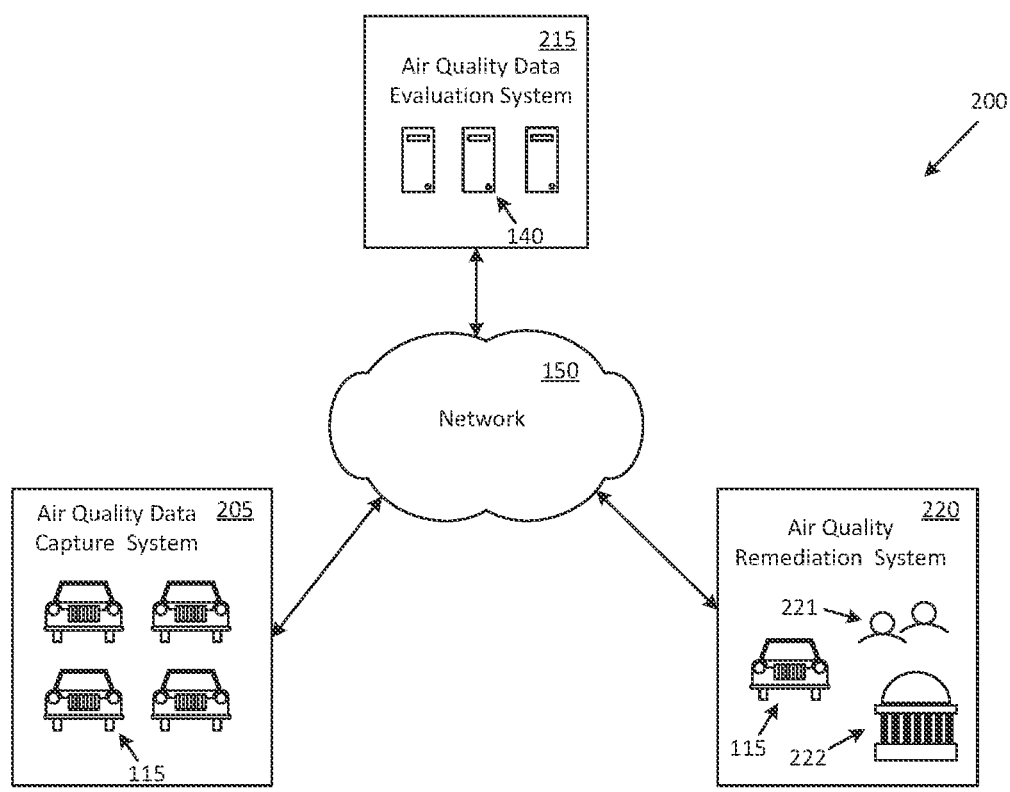
FIG. 2 shows an example system to detect and remediate air pollution in accordance with an embodiment of the disclosure.

FIG. 2 shows an example system 200 to detect and remediate air pollution in accordance with an embodiment of the disclosure. The system 200 can include an air quality data capture system 205, an air quality data evaluation system 215, and an air quality remediation system 220 that are communicatively coupled to each other via the communications network 150.

The air quality data capture system 205 is a wide area air pollution detection system that utilizes one or more vehicles such as, for example, the vehicle 115 to operate as mobile air pollution detectors. Computing elements provided in the vehicles, such as, the vehicle controller 110 referred to above, operate as edge computers that convey air pollution information to the air quality data evaluation system 215 via the communications network 150. Air pollution levels may be measured over a large area for purposes such as, for example, to enact pollution control ordinances, and may be measured over a hyperlocal area for purposes such as, for example, re-routing traffic away from a high pollution concentration locality.

In an example implementation in accordance with the disclosure, sensor systems in one or more vehicles capture data pertaining to air pollution levels in the vicinity of each of these other vehicles. The sensor systems convey the information to the respective vehicle controllers. The vehicle controllers may evaluate the data in various ways for obtaining air pollution measurement statistics that can be conveyed to the air quality data evaluation system 215. In some cases, the vehicle controllers may convey raw sensor data to the air quality data evaluation system 215 for evaluation. The phrase "measurement statistic" as used herein encompasses all forms of data that can be transferred from the air quality data capture system 205 to the air quality data evaluation system 215. Some examples can include raw sensor data as well as computation results obtained by evaluating sensor data (such as, for example, statistical parameters).

In some implementations, some or all of the vehicle controllers may provide additional data/information to the air quality data evaluation system 215. Some examples of such data/information can include weather conditions, traffic conditions, time-related information, and hyperlocal information (ordinances, public events, sports events, etc.). The air quality data evaluation system 215 may use this information when evaluating the air quality related data provided by the vehicle controllers. In one case, for example, the air quality data evaluation system 215 may determine that a high level of particulate pollution in one locality is due to high humidity at a particular time of day, or may determine that a high level of nitrogen oxides at another locality is due to traffic congestion at a sports event that is taking place.

The air quality data evaluation system 215 can include a single computer in some implementations and multiple computers that are networked together in other implementations. Each of the illustrated computers can be referred to herein as a "server computer" (such as, for example, the server computer 140) but can include various client computers as well. In some other implementations, air quality data evaluation system 215 can include the user device 120. The user device 120 may be a client device to the server computer 140 in some scenarios and may be independent of the server computer 140 in some other scenarios.

The air quality data evaluation system 215 may query and obtain air quality data from the vehicles that are a part of the air quality data capture system 205. In one example procedure, the air quality data evaluation system 215 may derive macro level (wide area) air quality information by evaluating air quality data (measurement statistics) received from multiple vehicles located in a geographically dispersed area. In another example procedure, the air quality data evaluation system 215 may derive hyperlocal air quality information by evaluating measurement statistics received from a first vehicle located in a first area and comparing this information to hyperlocal air quality information derived by evaluating measurement statistics received from a second vehicle located at the same area at a later instant in time (later in the day, for example). In yet another example procedure, the air quality data evaluation system 215 may derive hyperlocal air quality information by evaluating measurement statistics received from a first vehicle located in a first area and comparing this information to hyperlocal air quality information derived by evaluating measurement statistics received from a second vehicle located in a second area.

The air quality data evaluation system 215 may convey air quality data evaluation results to the air quality remediation system 220. The air quality remediation system 220 can include one or more of various entities. In an example implementation, the air quality remediation system 220 can include one or more of the vehicles that are a part of the air quality data capture system 205 (such as, for example, the vehicle 115), one or more individuals 221, and/or one or more agencies 222.

Air quality remediation procedures may be executed by the air quality remediation system 220 in various ways. In one example air quality remediation procedure, the vehicle 115 may receive a directive from the server computer 140 to move away from a first location having a poor AQI rating to a second location that has a better AQI so as to improve the AQI at the first location. The AQI at the first location may be determined by the server computer 140 based on evaluating sensor data and/or measurement statistics provided by the vehicle 115 and/or other vehicles to the server computer 140.

In another example air quality remediation procedure, one or more of individuals 221 may decide to improve the AQI in an area, such as, for example, by deciding to cancel traveling to a public event to be held in the area, by using public transport (bus, train, etc.) to attend the public event, and/or by walking to the public event.

In yet another example air quality remediation procedure, an agency such as, for example, a municipal body or a traffic control agency, may transmit a pollution alert to one or more types of devices (smartphones, radio, television, billboards etc.). The pollution alert may provide information about a poor AQI in a certain area and may further include a recommendation to alleviate pollution in the affected area.

The agency may also take additional steps such as, for example, issuing an ordinance to improve the AQI in the area. In some cases, the ordinance may be generated based on input obtained from the public (meetings, feedback, discussions, etc.). The ordinance may be directed at changing traffic patterns and/or traffic regulations in the area (rerouting, banning traffic during certain hours, one-way traffic movement, banning movement of gasoline vehicles in the area, providing incentives to use ride share services etc.).

In some scenarios, traffic authorities may implement a variable pricing scheme that is directed at reducing pollution levels in various areas at various times. For example, a variable pricing scheme may be applied for use of an express lane in a multi-lane highway, to purchase tickets in a public transport vehicle (train, bus, etc.), to purchase tickets for an event (entry into a sports arena, for example), and/or for parking spots in a parking lot. The variable pricing scheme may be based on various types of analysis performed by the air quality data evaluation system 215 upon air quality measurements provided to the air quality data evaluation system 215 by the air quality data capture system 205.

Figure 3:
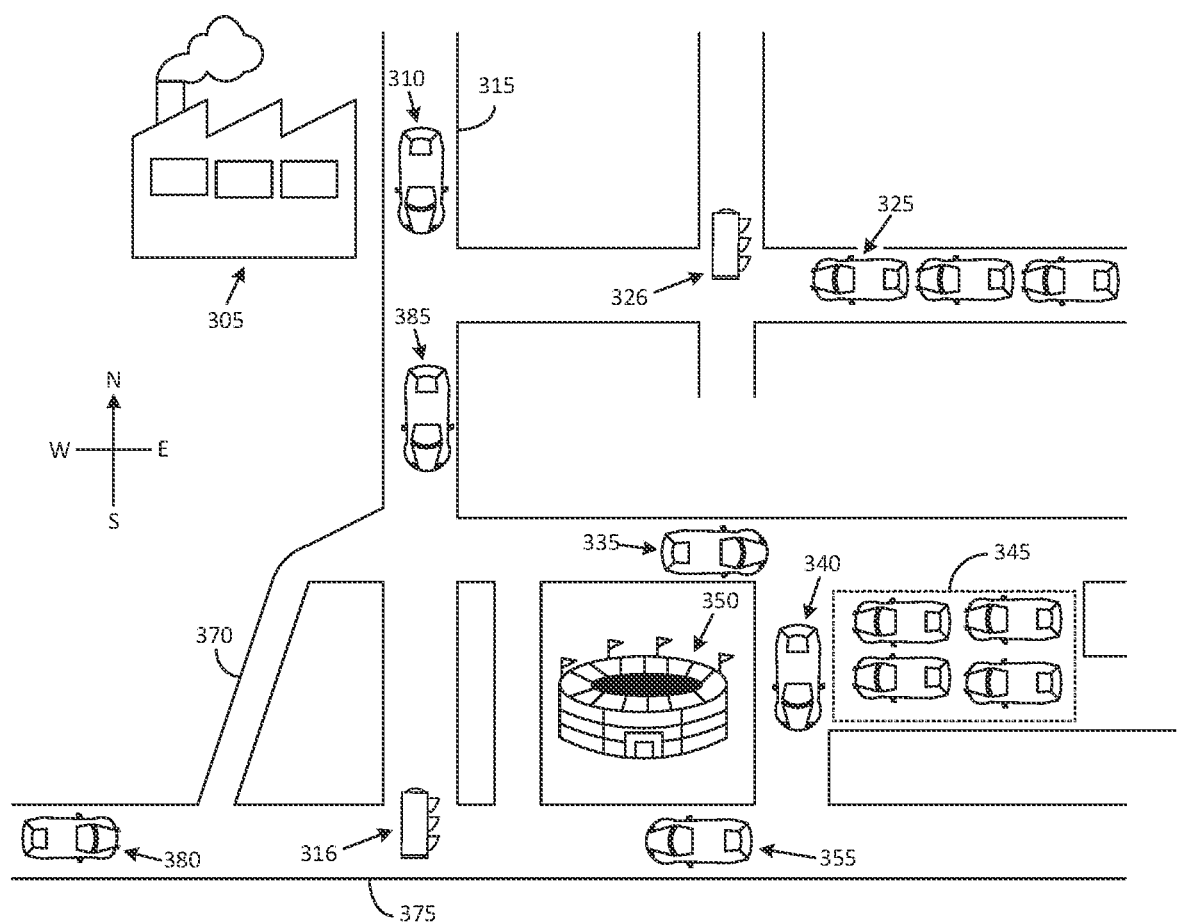
FIG. 3 illustrates an example scenario associated with detection and remediation of air pollution in accordance with an embodiment of the disclosure.

FIG. 3 illustrates an example scenario associated with detection and remediation of air pollution in accordance with an embodiment of the disclosure. In this example scenario, a vehicle 310 is traveling south on a road 315. A factory 305 is located near a current location of the vehicle 310. The factory 305 emits pollutants into the air throughout the day. Consequently, the AQI in the area is poor throughout the day.

Another vehicle 325 is stopped at an intersection (along with other vehicles) due to a red condition of a traffic light 326. The vehicle 325 and the other vehicles stopped at the intersection produce pollutants that contribute to poor AQI at the intersection. The poor AQI may last as long as the vehicles are stopped due to the red light and improves when the vehicles start to move away from the intersection. The AQI also improves when traffic density at the intersection is low during non-peak traffic hours of the day.

A vehicle 335, a vehicle 340, and a vehicle 355, are a few example vehicles that are circling around a sports arena 350 looking for vacant parking spots because a parking lot 345 of the sports arena 350 is full. These vehicles not only contribute to traffic congestion near the sports arena 350 but also contribute to a poor AQI around the sports arena 350.

Each of the example vehicles shown in FIG. 3 may include a vehicle controller configured to capture pollution data in the manner described above with respect to the vehicle 115. One or more of the computers of the air quality data evaluation system 215 (such as, for example, the server computer 140) may be configured to communicate with the various vehicle controllers to obtain air pollution measurement statistics and evaluate the measurement statistics in order to detect air pollution levels at various locations in the geographical area illustrated in FIG. 3.

Figure 4:
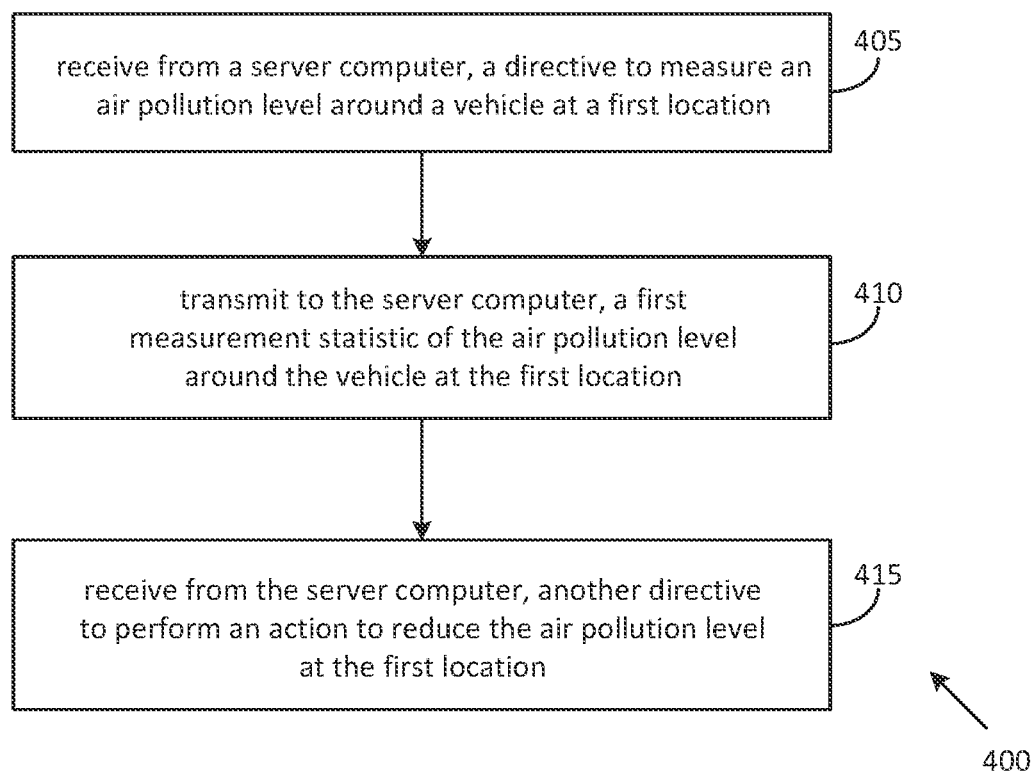
FIG. 4 shows a flowchart of a method of use of a vehicle to detect and remediate air pollution in accordance with an embodiment of the disclosure.

FIG. 4 shows a flowchart 400 of an example method to detect air pollution at one or more locations in a geographical area such as the geographical area illustrated in FIG. 3, and to perform remediation actions in accordance with an embodiment of the disclosure.

The flowchart 400 illustrates a sequence of operations that can be implemented in hardware, software, or a combination thereof. In the context of software, the operations represent computer-executable instructions stored on one or more non-transitory computer-readable media such as a memory in the vehicle controller 110 and/or in the server computer 140, that, when executed by one or more processors such as a processor in the vehicle controller 110 and/or in the server computer 140, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The flowchart 400 is described below by referring to various objects illustrated in FIGS. 1 through 3. But it must be understood that the description is equally applicable to many other similar, or identical, objects in other implementations and embodiments.

At block 405, a vehicle controller of a vehicle receives a directive to measure an air pollution level in the vicinity of the vehicle. In one example implementation, the directive is issued by the server computer 140. In another example implementation, the directive is issued by the individual 125 via the user device 120.

At block 410, the vehicle controller executes a measurement procedure and transmits air pollution data (in the form of a measurement statistic and/or raw data) to the server computer 140. The server computer 140 evaluates the air pollution data and identifies a high level of air pollution (poor AQI).

At block 415, the vehicle controller receives another directive from the server computer 140 to perform a remediation action to reduce the air pollution level in the area where the vehicle is currently located.

In a first example scenario of the steps described above, the server computer 140 transmits a first directive to a vehicle controller of the vehicle 310 to measure an air pollution level in the vicinity of the vehicle 310. The vehicle controller executes an air quality measurement and transmits air pollution data to the server computer 140 (in the form of a measurement statistic and/or raw data). In an example implementation of this scenario, the measurement statistic is a first timestamped measurement statistic that provides information to the server computer 140 about an air quality during a time at which the measurement was carried out by the vehicle controller of the vehicle 310.

The server computer 140 evaluates the air pollution data and identifies a high level of air pollution (poor AQI). However, the server computer 140 may be unable to suggest a specific remediation action (block 415) because the server computer 140 may be unable to identify the originating source of the pollution (the factory 305) and/or a characteristic of the air pollution present near the vehicle 310.

Consequently, in one example embodiment in accordance with disclosure, the server computer 140 may recommend a remediation action to the vehicle controller of the vehicle 310 to move the vehicle 310 from the current location to another location. The vehicle controller of the vehicle 310 may execute the remediation action by issuing an advisory to a driver of the vehicle 310 to move from the current location to another location. The advisory may be provided in the form of a message that is transmitted out of the speakers of an infotainment system in the vehicle 310. In some cases, the vehicle 310 can be an autonomous vehicle and the vehicle controller of the autonomous vehicle may autonomously move the vehicle 310 from the current location to another location.

In another example embodiment in accordance with disclosure, the server computer may seek to identify the originating source of the pollution and/or a characteristic of the air pollution present near the vehicle 310. Towards this end, the server computer 140 may seek additional information from the vehicle controller of the vehicle 310 by sending another directive to perform another measurement of air quality in the area where the vehicle 310 is currently located (near the factory 305). The vehicle controller of the vehicle 310 responds to the directive by performing another air quality measurement followed by transmitting of a second timestamped measurement statistic that provides information to the server computer 140 about a second time at which the air quality measurement was carried out by the vehicle controller. The server computer 140 may identify similarities between the first timestamped measurement statistic and the second timestamped measurement statistic and classify the location at which the vehicle 310 is carrying out the measurements as a persistent pollution location.

The server computer 140 may also identify various other parameters by evaluating the first timestamped measurement statistic and the second timestamped measurement statistic. For example, the server computer 140 may determine a change in characteristic of the air pollution and/or a rate of change of the air pollution by evaluating the first timestamped measurement statistic and the second timestamped measurement statistic.

The change in characteristic of the air pollution may be caused, for example, by a change in the composition of pollutants indicated by the second timestamped measurement statistic versus those indicated by the first timestamped measurement statistic. The change in composition of the pollutants may be caused by various factors such as, for example, emissions by equipment in the factory, and/or by an engine of another vehicle that has moved close to the vehicle 310 (for example, a tractor trailer that has moved close to a sedan (vehicle 310)).

The rate of change of the air pollution may be caused by variations in operations of the factory 305, for example, (shift changes, lunch breaks, etc.) and/or due to traffic congestion at that location. In an example embodiment in accordance with disclosure, the rate of change of the air pollution may be determined by using two or more different sampling rates. For example, the server computer 140 may send a directive to the vehicle controller of the vehicle 310 to perform a first measurement by employing a first sampling rate and a second measurement by employing a second sampling rate. The vehicle controller may perform a first measurement and convey to the server computer 140 a first measurement statistic. The vehicle controller may perform a second measurement and convey to the server computer 140 a second measurement statistic (sequentially or concurrently with the first measurement statistic). The server computer 140 may evaluate the measurement statistics to determine a rate of change of air pollution in the vicinity of the vehicle 310, and/or to classify the location at which the vehicle 310 is carrying out the measurements as a persistent pollution location.

The procedures described above with respect to the vehicle 310 at the location near the factory 305 may be repeated at other locations in real time as the vehicle 310 moves away from the current location. The procedures described above with respect to the vehicle 310 may also be performed with respect to other vehicles such as, for example, the vehicle 325, the vehicle 335, the vehicle 340, and the vehicle 355. In the case of the vehicle 325, the server computer 140 may evaluate the timestamped measurement statistics and/or the measurement statistics obtained at various sampling rates for various purposes such as, for example, to determine a rate of change of air pollution at the location of the vehicle 325, a trend in changes in air pollution at the location of the vehicle 325, a change in the composition of pollutants at the location of the vehicle 325, and/or to classify a nature of the location of the vehicle 325.

The air pollution at the intersection where the traffic light 326 is located may be primarily caused by the emission of nitrogen oxides by vehicle 325 and other vehicles at the intersection when the vehicles are stopped due to the red light. The air pollution drops when the vehicles start to move away from the intersection. The air pollution also drops when traffic density at the intersection is low during non-peak traffic hours of the day.

In an example embodiment in accordance with disclosure, the server computer 140 may select the first sampling rate and/or the second sampling rate based on this fluctuation of air pollution (hourly sampling, daily sampling, weekly sampling, etc.) and/or based on the timings of the traffic light 326 (on/off periods of the red light and/or the green light). A sampling rate based on the timing of the traffic light 326 may involve air pollution level measurements when the traffic light 326 is red (poor AQI) and/or when the traffic light 326 is green (improved AQI).

The composition of the pollutants at the location of the vehicle 325 may be generally non-varying. The server computer 140 may classify the intersection where the traffic light 326 is locates as a transient pollution location because the AQI improves at night and during the weekends, for example.

The server computer 140 may evaluate measurement statistics obtained from the vehicle 335, the vehicle 340, and/or the vehicle 355 to determine that the area around the sports arena 350 has poor air quality due to traffic congestion. The server computer 140 may also classify the area around the sports arena 350 as a transient pollution location.

In an example embodiment in accordance with disclosure, the server computer 140 may transmit directives to one or more vehicles to execute remediation measures to improve the air quality near the sports arena 350. An example remediation measure involves routing of traffic away from the sports arena 350. The server computer 140 may detect that the vehicle 335, the vehicle 340, and the vehicle 355 are circling the sports arena 350 looking for a vacant sport and that it may be impractical to direct these vehicles to move away from the sports arena 350. However, the server computer 140 may also determine that there are other vehicles that can be diverted away from the area near the sport arena 350.

The server computer 140 may therefore transmit a directive to the vehicle 385 to travel on an alternative route instead of traveling closer to the area surrounding the sports arena 350. The driver of the vehicle 385 or the vehicle controller of the vehicle 385 (when the vehicle 385 is an autonomous vehicle) may respond to the directive by modifying his/her planned travel route. The planned travel route may involve the vehicle 385 traveling south on the road 315 to reach the road 375 at the traffic light 316. The alternative travel route that is selected by the driver/vehicle controller of the vehicle 385 as a remediation measure may involve the vehicle 385 traveling south on the road 315 and turning into the road 370 to reach the road 375. In some implementations, the alternative route may be determined by the server computer 140 and conveyed to the vehicle controller of the vehicle 385 (in some cases, along with navigation guidance to travel on the alternate route).

The server computer 140 may transmit another directive to the vehicle 380 to turn around or to travel on an alternative route instead of traveling closer to the area surrounding the sports arena 350.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as a memory in the vehicle controller 110, can include any one memory element or a combination of volatile memory elements (e.g., random access memory (RAM, such as DRAM, SRAM, SDRAM, etc.) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including vehicle computers, personal computers, desktop computers, laptop computers, message processors, user devices, multi-processor systems, microprocessor-based or programmable consumer electronics, network PCs, mini-computers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    receiving, by a first vehicle, a first directive to measure a hyperlocal air pollution level around the first vehicle at a first location, wherein the first vehicle is an at least partially autonomous vehicle, and wherein the first directive includes an instruction to measure the hyperlocal air pollution level by employing a first sampling rate;
    measuring, by the first vehicle, a first measurement of the hyperlocal air pollution level around the first vehicle at the first location, wherein the first measurement is obtained by employing the first sampling rate;
    transmitting, by the first vehicle, the first measurement;
    receiving, by the first vehicle and based on an evaluation of the first measurement and an industrial, infrastructural, or transportation activity associated with the first location, a second directive for the first vehicle to perform a remedial action to reduce the hyperlocal air pollution level at the first location;
    performing, by the first vehicle and at least partially autonomously, the remedial action; and
    receiving, by the first vehicle, a third directive to measure the hyperlocal air pollution level around the first vehicle by employing a second sampling rate, wherein the second sampling rate is selected based on the evaluation of the first measurement and a determination that the first location is one of a transient pollution location or a persistent pollution location, and wherein the determination is based on the industrial, infrastructural, or transportation activity and the remedial action.

2. The method of claim 1, wherein the remedial action comprises moving the first vehicle from the first location to a second location.

3. The method of claim 2, wherein moving the first vehicle from the first location to the second location comprises issuing an advisory to an occupant of the first vehicle that the first vehicle should be moved to the second location.

4. The method of claim 1, wherein the first vehicle is the autonomous vehicle, and wherein the second directive directs the autonomous vehicle to move from the first location to a second location.

5. The method of claim 1, further comprising:
    receiving, by a second vehicle, a fourth directive to avoid traveling to the first location so as to reduce the hyperlocal air pollution level at the first location.

6. A method comprising:
    transmitting, by a server computer, to a first computer of a first vehicle, a first directive to measure a hyperlocal air pollution level around the first vehicle at a first location, wherein the first vehicle is an at least partially autonomous vehicle, and wherein the first directive includes an instruction to measure the hyperlocal air pollution level by employing a first sampling rate;
    determining, by the first vehicle, a first measurement statistic of the hyperlocal air pollution level around the first vehicle at the first location, wherein the first measurement statistic is obtained by employing the first sampling rate;
    determining an industrial, infrastructural, or transportation activity associated with the first location;
    receiving, by the server computer, from the first computer, the first measurement statistic;
    evaluating, by the server computer, the first measurement statistic;
    transmitting, by the server computer, to the first computer, based on evaluating the first measurement statistic and determining the industrial, infrastructural, or transportation activity, a second directive for the first vehicle to perform a remedial action to reduce the air pollution level at the first location;
    performing, by the first vehicle and at least partially autonomously, the remedial action; and
    transmitting, by the server computer, to the first computer, a third directive to measure the hyperlocal air pollution level around the first vehicle by employing a second sampling rate, wherein the second sampling rate is selected based on evaluating the first measurement statistic and determining, by the server computer, based on the industrial, infrastructural, or transportation activity and the remedial action, that the first location is one of a transient pollution location or a persistent pollution location.

7. The method of claim 6, wherein the first computer is a vehicle controller, and wherein the remedial action comprises moving the first vehicle from the first location to a second location.

8. The method of claim 6, further comprising:
    transmitting, by the server computer, to a second computer of a second vehicle, a fourth directive to avoid travel of the second vehicle to the first location so as to reduce the hyperlocal air pollution level at the first location.

9. The method of claim 6, wherein the first measurement statistic includes a first timestamp indicating a first time at which a first measurement of the hyperlocal air pollution level was performed by the first computer, the method further comprising:

receiving, by the server computer, from the first computer, a second measurement statistic that includes a second timestamp indicating a second time at which a second measurement of the hyperlocal air pollution level was performed by the first computer; and determining, by the server computer, that the first location is one of the transient pollution location or the persistent pollution location further based on evaluating the first measurement statistic that includes the first timestamp and the second measurement statistic that includes the second timestamp.

10. The method of claim 6, wherein the first measurement statistic includes a first timestamp indicating a first time at which a first measurement of the hyperlocal air pollution level was performed by the first computer, the method further comprising:

receiving, by the server computer, from the first computer, a second measurement statistic that includes a second timestamp indicating a second time at which a second measurement of the hyperlocal air pollution level was performed by the first computer; and identifying, by the server computer, a change in a characteristic of the hyperlocal air pollution level based on evaluating the first measurement statistic that includes the first timestamp and the second measurement statistic that includes the second timestamp.

11. The method of claim 10, wherein the change in the characteristic of the hyperlocal air pollution level comprises a change in an air quality index at the first location or a rate of change in the air quality index at the first location.

12. The method of claim 11, further comprising:

identifying, by the server computer, a contributing element that contributes to the change in the air quality index at the first location, wherein the contributing element is associated with the industrial, infrastructural, or transportation activity.

13. The method of claim 12, wherein the contributing element comprises an engine of a second vehicle or an equipment at the first location that emits an airborne pollutant.

14. A vehicle controller in an at least partially autonomous vehicle, the vehicle controller comprising:

a memory that stores computer-executable instructions; and a processor configured to access the memory and execute the computer-executable instructions to at least:

receive, from a server computer, a first directive to measure a hyperlocal air pollution level around the at least partially autonomous vehicle at a first location, wherein the first directive includes an instruction to measure the hyperlocal air pollution level by employing a first sample rate;

determine, by the at least partially autonomous vehicle, a first measurement statistic of the hyperlocal air pollution level around the at least partially autonomous vehicle at the first location, wherein the first measurement statistic is obtained by employing the first sampling rate;

transmit, to the server computer, the first measurement statistic;

receive, from the server computer, based on an evaluation of the first measurement statistic by the server computer and an industrial, infrastructural, or transportation activity associated with the first location, a second directive for the vehicle controller to perform a remedial action to reduce the hyperlocal air pollution level at the first location;

perform, by the at least partially autonomous vehicle, the remedial action;

receive, from the server computer, a third directive to measure the hyperlocal air pollution level around the at least partially autonomous vehicle by employing a second sampling rate, wherein the second sampling rate is determined by the server computer based on the evaluation of the first measurement statistic and a determination that the first location is one of a transient pollution location or a persistent pollution location, and wherein the determination is based on the industrial, infrastructural, or transportation activity and the remedial action; and transmit, to the server computer, a second measurement statistic obtained by employing the second sampling rate.

15. The vehicle controller of claim 14, wherein the remedial action to reduce the hyperlocal air pollution level at the first location comprises the vehicle controller issuing an advisory to an occupant of the at least partially autonomous vehicle that the at least partially autonomous vehicle should move from the first location to a second location.

16. The vehicle controller of claim 14, wherein the at least partially autonomous vehicle is an autonomous vehicle, and wherein the second directive directs the vehicle controller to move the autonomous vehicle from the first location to a second location.

* * * * *